(12) United States Patent
McIntyre et al.

(10) Patent No.: US 11,371,190 B2
(45) Date of Patent: Jun. 28, 2022

(54) TREATED TITANIUM DIOXIDE PIGMENT WITH HIGH MAGNESIUM OXIDE ADDITION, PROCESS OF MAKING THEREOF AND USE THEREOF IN PAPER MANUFACTURE

(71) Applicant: TRONOX LLC, Oklahoma City, OK (US)

(72) Inventors: Robert McIntyre, Louth (GB); Julie Elizabeth Kerrod, Lincolnshire (GB); Ben Webber, Grimsby (GB); Neil Burniston, Brigg (GB)

(73) Assignee: TRONOX LLC, Oklahoma City, OK (US)

( * ) Notice: Subject to any disclaimer, the term of this patent is extended or adjusted under 35 U.S.C. 154(b) by 0 days.

(21) Appl. No.: 17/253,303

(22) PCT Filed: Jun. 19, 2019

(86) PCT No.: PCT/US2019/037937
§ 371 (c)(1),
(2) Date: Dec. 17, 2020

(87) PCT Pub. No.: WO2019/246226
PCT Pub. Date: Dec. 26, 2019

(65) Prior Publication Data
US 2021/0292569 A1   Sep. 23, 2021

Related U.S. Application Data

(60) Provisional application No. 62/686,840, filed on Jun. 19, 2018, provisional application No. 62/686,829, filed on Jun. 19, 2018.

(51) Int. Cl.
*C09C 1/36* (2006.01)
*C09C 3/06* (2006.01)
(Continued)

(52) U.S. Cl.
CPC ......... *D21H 21/285* (2013.01); *C09C 1/3661* (2013.01); *C09C 3/063* (2013.01);
(Continued)

(58) Field of Classification Search
CPC .................................................. C09C 1/3661
See application file for complete search history.

(56) References Cited

U.S. PATENT DOCUMENTS 3,103,473 A   9/1963  Juda
3,505,772 A   4/1970  DeClaire et al.
(Continued)

FOREIGN PATENT DOCUMENTS

CN   103113762   5/2013
GB   1368601     10/1974
(Continued)

OTHER PUBLICATIONS

Chinese Office Action mailed in corresponding Chinese Application No. 201980048225.5 dated Jun. 11, 2021, pp. 1-12.
(Continued)

*Primary Examiner* — Robert A Vetere
(74) *Attorney, Agent, or Firm* — McAfee & Taft

(57) ABSTRACT

Process for the surface treatment of a titanium dioxide pigment, characterized in that it comprises the following steps: an aqueous suspension of titanium dioxide pigments is formed, in a first step, a layer of alumina phosphate is precipitated on the surface of the pigment, in a second step, a layer of alumina is precipitated over the first layer of alumina phosphate, and in a third step, a layer of magnesium oxide and alumina is precipitated on the layer of alumina. Also included are titanium dioxide pigments made by the disclosed process and method using said pigments in paper manufacturing.

7 Claims, 4 Drawing Sheets

| Magnesium Oxide/Alumina layer |
| Alumina layer |
| Aluminum Phosphate layer |
| Titanium Dioxide |

(51) Int. Cl.
    *D21H 21/28*     (2006.01)
    *D21H 17/67*     (2006.01)
    *D21H 17/00*     (2006.01)
    *D21H 17/69*     (2006.01)

(52) U.S. Cl.
    CPC .......... *D21H 17/675* (2013.01); *D21H 17/69* (2013.01); *D21H 17/73* (2013.01); *C01P 2004/03* (2013.01); *C01P 2004/04* (2013.01); *C01P 2004/80* (2013.01); *C01P 2004/84* (2013.01); *C01P 2006/12* (2013.01)

(56) References Cited

U.S. PATENT DOCUMENTS

| | | |
|---|---|---|
| 3,523,809 A | 8/1970 | Holbein |
| 3,853,575 A | 12/1974 | Holle et al. |
| 4,400,365 A | 8/1983 | Haacke et al. |
| 5,114,486 A | 5/1992 | Demosthenous et al. |
| 5,665,466 A * | 9/1997 | Guez .................... C09C 1/3661 106/443 |
| 5,942,281 A | 8/1999 | Guez et al. |
| 7,824,486 B2 | 11/2010 | Thiele |
| 7,842,131 B2 | 11/2010 | Blumel et al. |
| 8,641,870 B2 | 2/2014 | Jurgens et al. |
| 2005/0011408 A1 | 1/2005 | Drews-Nicolai et al. |
| 2007/0175363 A1* | 8/2007 | Blumel ................. C09C 1/3661 428/404 |
| 2021/0262171 A1 | 8/2021 | McIntyre et al. |

FOREIGN PATENT DOCUMENTS

| | | |
|---|---|---|
| JP | S49-008018 | 1/1974 |
| JP | H08225323 A | 9/1996 |
| JP | 2000136497 A | 5/2000 |
| JP | 2006528249 A | 12/2006 |
| WO | 2005/017049 A1 | 2/2005 |
| WO | 2014078040 A1 | 5/2014 |

OTHER PUBLICATIONS

Japanese Office Action mailed in corresponding Japanese Appln. No. 2020-571358 dated Jan. 25, 2022.
Chinese Office Action mailed in corresponding Chinese Application No. 201980048225.5 dated Dec. 8, 2021.
European Search Report mailed in corresponding European Application No. 19823112.8 dated Apr. 2, 2022.
Indian Office Action mailed in corresponding Indian Application No. 202017054059 dated Mar. 19, 2021.
Japanese Office Action mailed in corresponding Japanese Application No. 2020-571544 dated Jan. 25, 2022.
Chinese Office Action mailed in corresponding Chinese Application No. 201980048309.9 dated Jan. 19, 2022.
Search Report issued in corresponding European Application No. 19823606.9, dated Mar. 2, 2022.
Office Action issued in corresponding Japanese Application No. 2020571358, dated Jan. 25, 2022.
Examiner's Requisition issued in corresponding Canadian Patent Application No. 3,104,474, dated Mar. 25, 2022.
PCT International Search Report & Written Opinion mailed in corresponding PCT Application No. PCT/US2019/037937 dated Sep. 12, 2019, pp. 1-9.

* cited by examiner

| Magnesium Oxide/Alumina layer |
|---|
| Alumina layer |
| Aluminum Phosphate layer |
| Titanium Dioxide |

FIG. 1

FIG. 2 (Comparative)

FIG. 3 (Comparative)

TREATED TITANIUM DIOXIDE PIGMENT WITH HIGH MAGNESIUM OXIDE ADDITION, PROCESS OF MAKING THEREOF AND USE THEREOF IN PAPER MANUFACTURE

CROSS REFERENCE TO RELATED APPLICATION

This application claims the benefit of United States Provisional Patent Application No. 62/686,840 filed on Jun. 19, 2018, and U.S. Provisional Patent Application No. 62/686,829 filed on Jun. 19, 2018, both of which are hereby incorporated by reference.

FIELD OF THE INVENTION

The present invention relates to a titanium dioxide pigment, a process for the surface treatment of a titanium dioxide pigment, and the use of the titanium dioxide pigment in paper manufacture.

BACKGROUND OF THE INVENTION

It is known that titanium dioxide, either in rutile or anatase form, may be used advantageously as an opacifying pigment in paper manufacture. This is because titanium dioxide is a white pigment which has a high refractive index; it is among the compounds which, for an optimum particle size (generally 0.2 to 0.3 µm), best diffuse light.

The incorporation of titanium dioxide into paper usually consists in mixing the titanium dioxide with cellulose fibers which are predispersed in water. More or less efficient binding by electrostatic attraction between the cellulose fiber and the titanium dioxide particles can then take place. The cellulose fiber is by nature negatively charged.

The opacity of the paper pigmented with titanium dioxide depends in particular on the titanium dioxide content of the paper; it is thus a function of the level of binding to the cellulose fibers and the physicochemical retention of the titanium dioxide. However, while retention is an important property for opacity, also important is the level of dispersion of the pigment along the paper fibers.

Previously, titanium dioxides used as opacifying pigments had insufficient physicochemical retention. The problem of insufficient physicochemical retention was solved in U.S. Pat. No. 5,665,466, which referred to a titanium dioxide pigment for paper manufacture formed by a multi-step process comprising coating a titanium dioxide core successively with at least a layer of aluminum phosphate, followed by a layer of alumina. Optionally, the alumina layer is followed with a layer of magnesium oxide.

However, while there was physicochemical retention improvement for these titanium dioxide pigments in addition to suitable lightfastness (light stability) and zeta potential, a problem with these pigments, especially those with a layer of magnesium oxide, was the use of large concentrations (90-94.3% by weight) of titanium dioxide to make the pigment (see col. 4, lines 31-35 of the '466 patent)

A potential solution to this problem is to increase the opacity of the titanium dioxide pigment. While the user can benefit from the property of increased opacity by itself, an alternative benefit is that an increase in opacity relative to a desired standard can result in using less titanium dioxide or pigment to achieve the same desired standard.

In the context of paper and laminate manufacture, it would also be beneficial if the titanium dioxide was more efficiently dispersed on the paper surface.

However, increasing opacity alone is insufficient to increase the desirability of a titanium dioxide pigment for paper manufacture if it comes at the cost of other properties which make the pigment suitable to use, e.g. water soluble pH.

In the simultaneously filed application "Treated Titanium Dioxide Pigment, Process of Making Thereof and Use Thereof in Paper Manufacture" (Cristal Pigment UK), it was discovered that a solution to this problem was that by using a certain sequence of process steps and certain amounts of layer material, pigments with better opacity could be achieved than those described in the '466 patent, while retaining other properties which make such pigments suitable for paper manufacture.

While the addition of magnesium oxide layer was an important step towards achieving better opacity, merely increasing the amount of magnesium oxide was not effective in obtaining titanium oxide pigment which was suitable for paper manufacturing, i.e. whatever increases in opacity seen by increasing the amount of magnesium oxide were offset by decreasing other desirable properties such as water soluble pH. Moreover, increasing the amount of magnesium oxide added also increases the pH of composition.

As such, there is still a need in the art for titanium dioxide pigments for the paper manufacture which can increase opacity, but retain suitable pigment retention. Moreover, these pigments are also useful in providing greater sustainability and making paper manufacturing more environmentally friendly by being able to use less titanium dioxide to make the titanium dioxide pigment and/or use less titanium dioxide pigment to achieve the same effect as previously known titanium dioxide pigments.

SUMMARY

Surprisingly, a unique titanium dioxide treatment process has been discovered. The process can produce titanium dioxide pigments with enhanced opacity while retaining other desirable properties for use in paper manufacturing.

In one aspect, this disclosure provides for a process for making the titanium dioxide pigment which comprises providing a titanium dioxide suspension, a first treatment step comprising subjecting the titanium dioxide from said suspension to alumina and phosphoric acid to form an aluminum phosphate layer, a second treatment step comprising subjecting the titanium dioxide from the first treatment step to alumina to form an alumina layer, a third treatment step comprising subjecting the titanium dioxide from the second treatment step to magnesium sulfate and alumina to form a MgO/alumina layer.

In another aspect, this disclosure provides for a titanium dioxide pigment with lower titanium dioxide content which retains suitable opacity, pigment retention, lightfastness and zeta potential for paper manufacture.

In a further object, this disclosure provides for a titanium dioxide pigment of the invention suitable for paper and laminate use.

In still another aspect, this disclosure provides for a method of paper manufacture comprising adding the titanium dioxide pigment of the invention to a cellulose slurry.

BRIEF DESCRIPTION OF THE DRAWINGS

FIG. 1 depicts a basic representation of the layering on top of the titanium dioxide surface.

DETAILED DESCRIPTION

Figure 2:
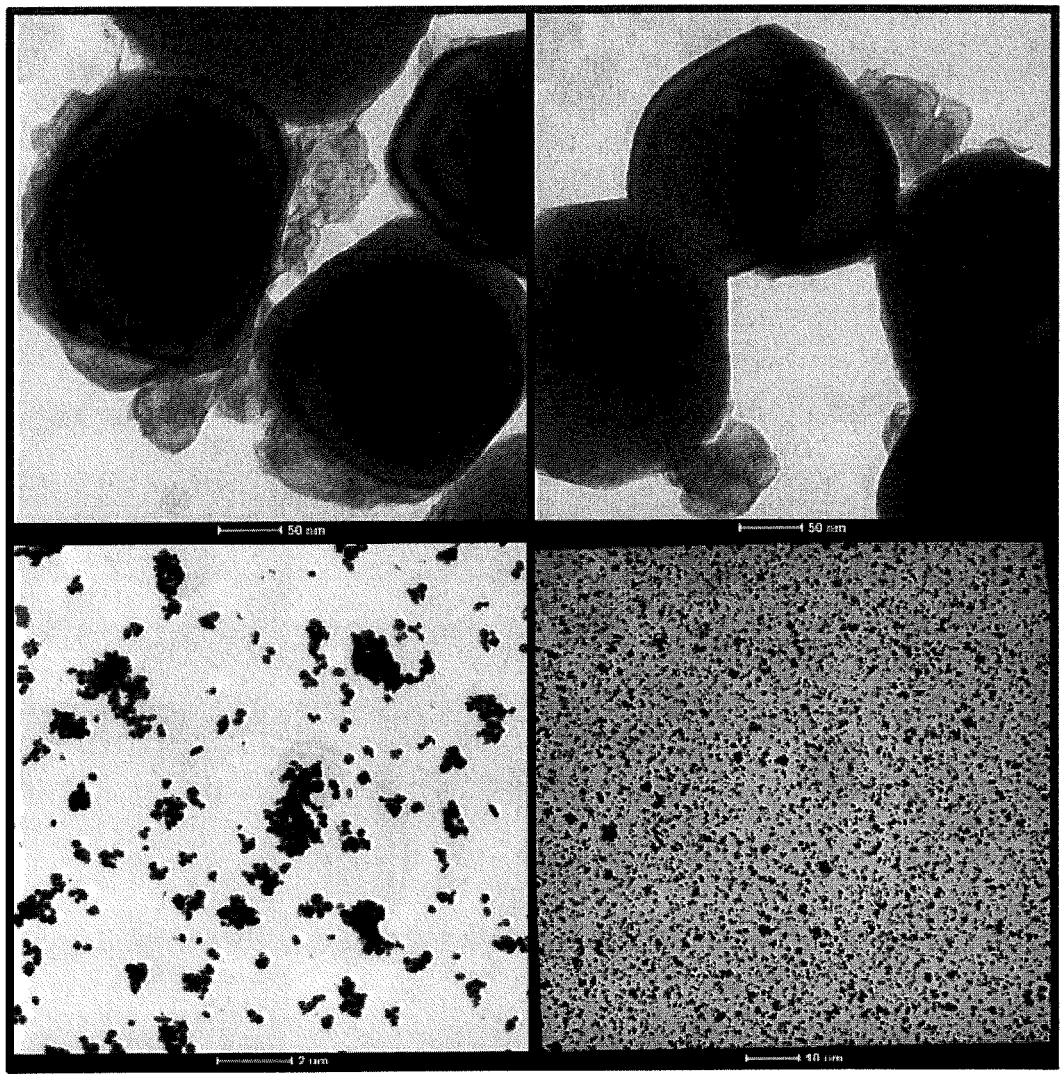
FIG. 2 is a TEM (transmission electron microscopy) image of the product of Comparative Example 1 made in accordance with U.S. Pat. No. 5,665,466 and also the dispersion pattern on paper.

The present disclosure may be understood more readily by reference to this detailed description. Numerous specific details are set forth in order to provide a thorough understanding of the embodiments described herein. However, it will be understood by those of ordinary skill in the art that the embodiments described herein can be practiced without these specific details. The description is not to be considered as limiting the scope of the embodiments described herein.

References to % by weight refer to % by weight of the composition unless otherwise indicated.

This disclosure relates to a process for the surface treatment of a titanium dioxide pigment, characterized by the following sequential steps: a first step of precipitating a layer of aluminum phosphate, followed by a second step of precipitating a layer of alumina, and followed by a third step of precipitating a layer of magnesium oxide with alumina.

Also, this disclosure relates to a titanium dioxide pigment comprising a titanium dioxide core coated successively with a layer of alumina phosphate, then with a layer of alumina and then with a layer formed by the precipitation of magnesium oxide with alumina.

Further, this disclosure relates to the use, in paper manufacture or in the manufacture of paper laminate, of the above pigment or of those obtained by the processes described above.

The pigment as defined herein or obtained by one of the processes described herein is of high physicochemical retention. Generally, such a pigment makes it possible for the paper to retain good opacity. In addition, it usually has good light-fastness.

In accordance with the above, the process for the surface treatment of titanium dioxide pigments is characterized in that it comprises the following steps in the following order:
forming an aqueous suspension of titanium dioxide pigments;
precipitating a layer of alumina phosphate on the surface of the pigments;
precipitating a layer of alumina over the layer of alumina phosphate;
precipitating a layer of magnesium oxide over the layer of alumina, wherein the precipitating of the layer of magnesium oxide comprises adding a magnesium source to the aqueous suspension after step (c) and adding a basic alumina source to the suspension during the addition of magnesium; and
recovering the titanium dioxide pigments from the suspension.

The treatment thus comprises first coating a titanium dioxide suspension with an aluminum phosphate precipitate at the titanium dioxide particle surface, which is then coated with alumina designed to provide a high surface area form (boehmite or pseudoboehmite) and then followed by incorporation of a magnesium compound and alumina at the surface of the treated titanium dioxide compound. The alumina coating is performed in multiple additional steps.

After incorporation of the magnesium compound and alumina, the treated particles are recovered and the salts are removed through a pH controlled washing process intended to produce a neutral pH pigment product. Optional post washing steps include incorporating an additive such as nitrate salts and/or drying and milling the pigment product. The pigment product may be in powder or slurry form.

In the first step of forming the titanium dioxide suspension, the suspension broadly can have a concentration of titanium dioxide in a range of from 100 to 500 WI, and more typically, the concentration of titanium dioxide is in a range of 300-500 g/l.

This dispersion may optionally contain a dispersing agent so as to disperse and stabilize it. It may be obtained in particular by grinding a dispersion of titanium dioxide using the said dispersing agent. The dispersing agent may be chosen from the following products: 2-amino-2-methyl-1-propanol, potassium or sodium tetrapyrophosphate, potassium or sodium hexametaphosphate, or alkali metal salts of polyacrylic acid polymer or copolymer, such as the ammonium or sodium salt of polyacrylic acid. When phosphate-based compounds are used, they are generally present in a concentration of the order of from 0.1 to 0.5% by weight, expressed as $P_2O_5$, relative to the weight of the titanium dioxide.

The surface treatment process is generally carried out at a temperature above 60° C., and more typically, in a range of 60-90° C. This temperature is maintained throughout the treatment.

The next step of the treatment consists in depositing a layer of alumina phosphate on the surface of the pigment by precipitation. Here and throughout the description, the term alumina phosphate refers to an aluminum-phosphorus oxyhydroxide compound. More particularly, this aluminium phosphorus oxyhydroxide precipitated on the surface of the titanium dioxide pigment according to the invention may be defined as being obtainable by precipitation under the operating conditions described below.

Usually, this first layer of alumina phosphate is precipitated from a phosphorus compound and an aluminium salt, in particular in the form of a solution. Advantageously, the phosphorus compound and then the aluminium salt are introduced successively into the aqueous suspension of titanium dioxide pigments. For example, by adding a source of phosphate to the titanium dioxide suspension, and then adding an aluminum salt, which may be by two or more altering steps.

In one preferred embodiment, the alumina phosphate is precipitated by the following, wherein the compounds are added in sequence to the titanium dioxide suspension:
(i) $Al_2O_3$ (alumina) from an alumina source;
(ii) source of phosphate from a phosphate source; and
(iii) $Al_2O_3$ from the same alumina source as step (i).

As regards the amount of aluminium salt introduced during the first step, this amount is preferably between 0.5 and 3% expressed as weight of $Al_2O_3$, relative to the weight of the titanium dioxide. The aluminum salts can be selected—for example—from aluminum salts in the group consisting of aluminum sulfate ($Al_2(SO_4)_3$; sodium aluminate ($NaAlO_2$), aluminum chloride ($AlCl_3$) and combinations thereof.

As regards the phosphorus compound or phosphorous source used in the first precipitation step, it may be introduced more particularly in an amount of at least 0.5% by weight of $P_2O_5$ relative to the weight of the titanium dioxide, and more particularly between 0.5 and 5%. Preferably, between 1% and 4% thereof may be introduced. The sources of phosphate, for example, can be selected from the group consisting of phosphoric acid, sodium salts of hexametaphosphate, potassium salts of hexametaphosphate, sodium salt of tetrapyrophosphate, potassium salts of tetrapyrophosphate and combinations thereof.

Typically, the amounts of aluminium salt and of phosphorus compound which are introduced are modified so as to precipitate a layer of alumina phosphate having a P/Al molar ratio of not more than 2. If a phosphate-based dispersing agent has been used to stabilize the starting titanium dioxide dispersion, the amount of phosphate provided by the dispersing agent is subtracted from the amount of phosphate introduced during the first precipitation step.

In general, the first precipitation step takes place at a pH which is suitable to precipitate the alumina phosphate as described above. This pH may be between 4 and 8. However, the first precipitation step is usually carried out at an acidic pH, preferably at a pH of not more than 6. This pH may more preferably be between 4 and 6.

The pH is controlled by the addition of phosphoric acid and/or of another acid such as sulphuric acid or hydrochloric acid. It may also be controlled by the simultaneous and/or alternate introduction of the phosphorus-based compound and the aluminium salt which together will form the alumina phosphate precipitate. This is the case, for example, when phosphoric acid and sodium aluminate are used during this first precipitation.

The next step of the treatment consists in depositing a layer of alumina over the layer of alumina phosphate. Here and throughout the description, the expression layer of alumina refers to a precipitate of an aluminium oxide and/or of an aluminium oxyhydroxide. Usually, this second layer is precipitated using an aluminium salt such as those defined for the precipitation of the first layer. The alumina may be in hydrated form (e.g. aluminum hydrate/aluminum hydroxide).

While the layer of alumina may be deposited by adding an alumina source to the titanium dioxide suspension in a single step, currently the process preferred is a multi-step alumina surface treatment wherein the titanium dioxide from the first precipitation step is subjected to multiple alumina surface treatment to form an alumina layer. Preferably, the multiple-step alumina surface treatment utilizes at least two different alumina sources. For example, the following can be added in sequence to the titanium dioxide suspension after application of the aluminum phosphate first layer:
(i) $Al_2O_3$ from an alumina source;
(ii) $Al_2O_3$ from a different alumina source than in step (i); and
(iii) $Al_2O_3$ from one or more alumina source from step (i) or (ii).

Thus, the second precipitation step can comprise three or more sub-steps of adding alumina sources to the titanium dioxide suspension obtained from the first precipitation step.

Generally, the first alumina source and second alumina source will both be an aluminum salt and can, for example, be selected from aluminum salts in the group consisting of aluminum sulfate ($Al_2(SO_4)_3$; sodium aluminate ($NaAlO_2$), aluminum chloride ($AlCl_3$) and combinations thereof. Typically, the selection of aluminum source will be with the restriction that the second alumina source is different than the first alumina source. More typically, they will have no overlapping aluminum salt components. Thus, if the first alumina source is aluminum sulfate, the second aluminum source can be sodium aluminate, aluminum chloride or a combination of the two but would not contain aluminum sulfate.

While it is within the scope of this disclosure for the third application of alumina (third sub-step) to have a different alumina source than either the first alumina source or second alumina source, more typically, the third application will use the same alumina source as either the first alumina source or the second alumina source. Additionally, it is within the scope of this disclosure for there to be subsequent applications of alumina following the third application of alumina in the above sub-step (iii).

The amount of alumina source introduced in the above sub-steps (i), (ii) and (iii), and any subsequent applications of alumina, can be from 0.5 to 5%, or from 1 to 4%, expressed as weight of $Al_2O_3$, relative to the weight of the titanium dioxide.

The precipitation in the sub-steps takes place at the pH required to precipitate the layer of alumina. Generally, this pH may be between 3 and 10, but can be 7 and 10. For example, the adjustment may be made by adding sulphuric acid.

The three or more alumina depositing sub-steps (steps (i), (ii) and (iii), above) are each typically followed by a maturation step or maturation time. These maturation steps generally comprise stirring the reaction medium obtained after introduction of an alumina source without further introduction of an alumina source for a period of time. The period of time or "maturation time" is generally 1 minute or more, or 3 minutes or more. Typically, the "maturation time" is from about 2 to about 10 minutes, from about 3 to about 7 minutes, or from 4 to 6 minutes after each alumina depositing sub-steps.

Additionally, maturation steps may be carried out after each precipitation step; that is a maturation time can be used after the first precipitation step (introduction of phosphorous compounds and aluminum salts) and after the second precipitation step (after all the alumina deposition steps have been carried out). These maturation steps comprise stirring the reaction medium obtained after introduction of all the phosphorus compounds and the aluminium salts involved in the first precipitation step, and in introducing all the aluminium salt involved in the second precipitation step. The maturation time after the first precipitation step and second precipitation step is generally of the order of from 5 to 30 min in each step.

After the first and second precipitation steps, magnesium oxide (MgO) from a magnesium source is deposited on the layer of alumina while maintaining pH through the addition of alumina. That is, a basic alumina source is added so that the suspension does not become more acidic during the addition of the magnesium source than the suspension was at the end of the second precipitation step. The addition of MgO will tend to make the titanium dioxide suspension more acidic; thus, adding the alumina in a basic form will maintain the pH of the suspension. Typically, the pH is maintained at or below 9 or at or below 8.5 during this MgO step. More typically, the pH will be maintained from 5 to 9, and preferably from 7 to 9, or from 7 to 8.5. Here and throughout the description, the term magnesium oxide refers to a magnesium oxide and/or hydroxide. This is usually magnesium dihydroxide.

The alumina for this step can be formed from an alumina source selected from the group consisting of aluminum sulfate ($Al_2(SO_4)_3$), sodium aluminate ($NaAlO_2$) and combinations thereof. Use of a basic alumina source in the third layer step eliminates the need for an additional base and accommodates the use of greater concentrations of magnesium oxide.

The magnesium compound may be selected from the group consisting of magnesium hydroxide, magnesium oxide, magnesium silicate, magnesium phosphate, magnesium aluminate, magnesium carbonate and combinations thereof.

The amount of magnesium salt introduced is generally greater than 0.01% by weight of MgO relative to the weight of the titanium dioxide, and can be in the range of 0.05% to 4%, or 0.1% to 3%.

This MgO latter precipitation may be followed by a step of maturation. The maturation time is generally of the order of from 5 to 30 min.

Following these MgO precipitation steps, the treated pigments are separated from the liquid phase of the suspension by any known means. The post treatment steps after adding the magnesium oxide third layer can include, but is not limited to, a pH adjustment after the MgO layer is added, filter washing the layered titanium dioxide suspension, reslurrying the cake containing the layered titanium dioxide and adjusting the pH of the slurry, dewatering the slurry, addition of a nitrate salt, a drying step, followed by a micronizing step to obtain the final titanium dioxide pigment product.

Typically, the process according to this disclosure have no silica added during the process; any silica present in the final pigment product results from trace impurities inseparable from the materials used in the process to make the titanium dioxide pigment.

The above described processes result in a titanium dioxide pigment containing from 80% to 90% by weight of titanium dioxide, and more typically, from 81% to 88% or from 84% to 88% by weight titanium dioxide. The resulting pigment can have from 1% to 4%, or from 2% to 3% by weight of $P_2O_5$. Additionally, the resulting pigment can have from 6% to 10% or from 7% to 9% by weight of analyzed alumina, which can be made up of but not limited to alumina from the aluminium phosphate component and alumina from the second precipitation step. The resulting pigment can have more than 0.01% by weight of MgO, but more typically can have from 0.05% to 4.0%, from 0.1% to 3%, from 0.1% to 2.9%, from 0.1% to 2.5% or from 0.1% to 1.75% by weight of MgO. Generally, the resulting pigment will have a BET Surface Area greater than 15 $m^2/g$, and generally, less than or equal to 40 $m^2/g$. More typically, the BET Surface Area can be from 18 $m^2/g$ to 40 $m^2/g$ from 20 $m^2/g$ to 40 $m^2/g$, from 22 $m^2/g$ to 35 $m^2/g$, from 28 $m^2/g$ to 33 $m^2/g$ or from 18 $m^2/g$ to 24 $m^2/g$. The resulting pigment can have a water-soluble pH of from 6.0 to 8.0. In some cases, the titanium dioxide pigment will include other components, which are not $TiO_2$, $P_2O_5$, $Al_2O_3$, or MgO. For example, such other components can include associated hydration or moisture, inorganic oxides (other than the primary components), ions (such as sodium, potassium, nitrate, chloride, sulphate, etc.), trace metals and organic additives.

For example, in one embodiment of the invention, the titanium dioxide pigment comprises:
- 80-90% by weight titanium dioxide;
- 1-4% by weight of $P_2O_5$;
- 6-10% by weight of analyzed alumina (which can be made up of but not limited to, alumina deposited at base pigment production, alumina from the aluminium phosphate component and alumina from the second alumina stage); and
- 0.05-4.0% by weight magnesium oxide,
  wherein the pigment has a BET surface area greater than 15 $m^2/g$.

In another embodiment of the invention, the titanium dioxide pigment comprises
- 81-88% by weight titanium dioxide;
- 2-3% by weight of $P_2O_5$;
- 7-9% by weight of analyzed alumina (which can be made up of but not limited to, alumina deposited at base pigment production, alumina from the aluminium phosphate component and alumina from the second alumina stage); and
- 0.1-2.9% by weight magnesium oxide,
  wherein the pigment has a BET surface area from 15 $m^2/g$ to 40 $m^2/g$, or from 20 $m^2/g$ to 40 $m^2/g$.

In another embodiment of the invention, the titanium dioxide pigment comprises:
- 81-88% by weight titanium dioxide;
- 2-3% by weight of $P_2O_5$;
- 7-9% by weight of analyzed alumina (which can be made up of but not limited to, alumina deposited at base pigment production, alumina from the aluminium phosphate component and alumina from the second alumina stage); and
- 0.1-1.75% by weight magnesium oxide,
  wherein the pigment has a BET surface area from 15 $m^2/g$ to 35 $m^2/g$, or from 22 $m^2/g$ to 35 $m^2/g$.

In another embodiment of the invention, the titanium dioxide pigment comprises:
- 84-88% by weight titanium dioxide;
- 2-3% by weight of $P_2O_5$;
- 7-9% by weight of analyzed alumina (which can be made up of but not limited to, alumina deposited at base pigment production, alumina from the aluminium phosphate component and alumina from the second alumina stage); and
- 0.1-1.75% by weight magnesium oxide,
  wherein the pigment has a BET surface area from 18 $m^2/g$ to 33 $m^2/g$, or from 28 $m^2/g$ to 33 $m^2/g$.

For all of the pigments described above, no silica was added during the process; any silica present in the final pigment product would have resulted from trace impurities inseparable from the materials used in the process to make the titanium dioxide pigment.

The pigments of this disclosure can be incorporated into compositions in the form of a slurry, suspension or dispersion.

Process of Using in Paper Manufacture

Lastly, the invention relates to the use, in the production of paper or paper laminates, of the pigments which are described above or which are obtained by the processes according to the invention.

In other embodiments, the current pigments are used in the production of paper or paper laminates. Any process of paper production (or of paper formulation) known to those skilled in the art may be employed. The paper is usually prepared from a mixture of water, cellulose fibers and a pigment according to this disclosure or one which is obtained according to processes of this disclosure. Optionally, the paper is prepared in the presence of an agent for improving the wet strength. The agent can comprise, for example, a quaternary ammonium salt of epichlorohydrin-based polymers (for example epichlorohydrin/dimethylamine polymers).

Embodiments also relate to the use of the pigment, as described above or obtained according to the processes described above, in the production of paper laminates based on paper containing the said pigment and at least one resin (in particular a melamine or melamine-formaldehyde resin). Any paper laminate production process known to those skilled in the art may be employed (using a paper pigmented with the pigment according to this disclosure) in order to prepare the laminates. The invention is not limited to one specific production process. Thus, for example, the pigmented paper may be impregnated with an aqueous-alcoholic solution of resin, after which several sheets of pigmented paper impregnated with resin are laminated by hot-pressing techniques. The pigmented paper may contain an agent for improving the wet strength.

Thus, in embodiments, the pigment can also be used to coat paper and/or laminates.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

In the following Examples, the comparative examples are not necessarily based upon the prior art. In some cases, the comparative examples use alternative techniques so as to better exemplify and compare with the current processes and products.

Example 1—Surface Treatment of Titanium Dioxide According to this Disclosure

A titanium dioxide suspension with a concentration of 400 g/L was provided and maintained at 70° C.

Aluminum phosphate first layer was deposited on the titanium dioxide by adding the following to the titanium dioxide suspension:
(i) 1.20% by weight $Al_2O_3$ (alumina) from NaAlO2 (sodium aluminate); and
(ii) 1.5% by weight $P_2O_5$ (phosphorus pentoxide) from $H_3PO_4$ (phosphoric acid).

An alumina second layer was deposited by adding the following in sequence to the titanium dioxide suspension after application of the aluminum phosphate first layer:
(i) 1% by weight $Al_2O_3$ from $Al_2(SO4)_3$ (aluminum sulfate) and retained for 5 minutes;
(ii) 1% by weight $Al_2O_3$ from $NaAlO_2$ and retained for 5 minutes; and
(iii) 0.87% by weight $Al_2O_3$ from $NaAlO_2$ maintained at pH 8.5 and then retained for 5 minutes.

A magnesium oxide/Alumina third layer was added to the titanium dioxide suspension after application of the alumina second layer, by adding 2.9% by weight MgO (magnesium oxide) from $MgSO_4.7H_2O$ while maintaining pH at 8.5 with 2.63% by weight $Al_2O_3$ from $NaAlO_2$ and then retained for greater than 15 minutes.

Post treatment steps included adjusting the pH to 6.7, filter washing the treated suspension, reslurrying the cake to 400 g/L and adjusting the pH to 6.0 with HCl, de-watering, blending 0.13% $KNO_3$ prior to drying, a drying step followed by a crushing and micronizing step to obtain the final titanium dioxide pigment product. No silica was added during the process.

Comparative Example 1—Titanium Dioxide Pigment Made from a Process in Accordance with Example 1 from U.S. Pat. No. 5,665,466

A titanium dioxide suspension with a concentration of 350 g/L was provided and maintained at a temperature of 60° C.

An aluminum phosphate first layer was deposited on the titanium dioxide by adding the following to the titanium dioxide suspension:
(i) 2.5% by weight of $P_2O_5$ in the form of a phosphoric acid solution; and
(ii) 1% by weight of $Al_2O_3$ in the form of a sodium aluminate solution.

These additions are performed over 10 min. The pH is adjusted, during the precipitation and at the end of the addition, by adding sulfuric acid, to between 4.8 and 5.2 and retained for 30 minutes.

To the dispersion with an aluminum-phosphate first layer described above was added 3.5% by weight of $Al_2O_3$ in the form of a sodium aluminate solution. This addition was performed over 10 min. During this addition, the pH is maintained at between 7 and 7.5 by adding sulfuric acid.

Post treatment steps include filtering the dispersion, washed with water at 45° C., drying at 150° C. for 15 hours and micronizing to form the titanium dioxide pigment. No silica was added during the process.

Comparative Example 1A (Benchmark)

A commercially sold product was used as the Benchmark Comparative. At the time the examples were conducted, this product was sold by The National Titanium Dioxide Co., Ltd. ("Cristal") as RCL-722. The product for the Benchmark Comparative was produced under general process conditions related to Comparative Example 1 and as also referred to in the '466 patent and were claimed in a divisional application (U.S. Pat. No. 5,942,281). The Benchmark Comparative pigment was a titanium dioxide pigment which contains 89.2% by weight titanium dioxide, 3.80% by weight aluminum phosphate and 3.01% by weight added alumina (no magnesium oxide).

Comparative Example 2—Titanium Dioxide Pigment Made from a Process in Accordance with Example 2 from U.S. Pat. No. 5,665,466

A titanium dioxide suspension with a concentration of 350 g/L was provided and maintained at a temperature of 80° C.

An aluminum phosphate first layer was deposited on the titanium dioxide by adding the following to the titanium dioxide suspension:
(i) 2.5% by weight of $P_2O_5$ in the form of a phosphoric acid solution; and
(ii) 1% by weight of $Al_2O_3$ in the form of a sodium aluminate solution.

The pH was lowered to 5 by adding phosphoric acid, and is then adjusted to between 4.8 and 5.2 by simultaneously adding sodium aluminate or phosphoric acid. At the end of the addition, the pH is controlled by adding sulfuric acid. The additions are performed over 10 min. Following this, the reaction mixture is kept stirring for 30 min.

To the dispersion with the aluminum phosphate first layer described above was added 3.5% by weight of $Al_2O_3$ in the form of sodium aluminate. The pH rose to 7 on adding sodium aluminate, and was then controlled by simultaneously adding sodium aluminate and sulfuric acid in order to retain this pH of 7. These additions are performed over 10 min. Following this, the reaction mixture is kept stirring for 15 min.

To the dispersion with the alumina second layer described above is added 0.5% by weight of MgO in the form of magnesium sulfate. The pH is adjusted to between 7 and 8 by simultaneously adding magnesium sulfate and a potassium hydroxide solution. Following this, the reaction mixture is kept stirring for 15 min.

Post treatment steps include filtering the dispersion, washed with water at 45° C., drying at 150° C. for 15 hours and micronizing to form the titanium dioxide pigment. No silica was added during the process.

Comparative Example 3

A comparative example was made based upon the teachings of the '466 patent, but to produce a titanium dioxide pigment which contains 83.5% by weight titanium dioxide, 3.66% by weight aluminum phosphate, 3.40% by weight alumina and 0.90% by weight magnesium oxide.

The process of making the pigment for Comparative Example 3 included:
providing a titanium dioxide suspension with a concentration of 400 g/L maintained at 70° C.;
adding an aluminum phosphate layer by treating with 4.5% by weight $AlPO_4$;
followed by adding an alumina layer by adding 3.80% by weight of alumina (half sourced from aluminum sulfate and the other half sourced from sodium aluminate); and
followed by a step of adding 1.5% by weight of magnesium oxide.
No silica was added during the process.

Comparative Example 4

The process of Comparative Example 3 was repeated with the exception that the amount of magnesium oxide added was increased to 2.1% by weight. The resulting titanium dioxide pigment contained 83.5% by weight titanium dioxide, 3.66% by weight aluminum phosphate, 3.40% by weight alumina and 2.10% by weight magnesium oxide.

Comparative Example 5

The process described in Example 1 was repeated except that the magnesium oxide third layer step was modified to 2.9% by weight MgO (magnesium oxide) from $MgSO_4 \cdot 7H_2O$ while maintaining pH at 8.5 with NaOH and then retained for greater than 15 minutes.

Effect on the Amount of $AlPO_4$ and $Al_2O_3$ on $TiO_2$ Pigment Characteristics Table 1 below is a compilation of the characteristics of the titanium dioxide pigments produced in the above examples.

While MgO can have a positive effect on opacity efficiency (which is shown by comparing the Benchmark and Comparative Example 1 opacity efficiencies vs. Comparative Example 2), it also has an alkaline effect on pH. It is preferred that the pH be neutral for $TiO_2$ pigments targeted for incorporation into paper and laminates in order to optimize zeta potential and enhancing processability. The more alkaline the pH, the more acid which must be added at the end of the surface treatment to lower the pH prior to filtering. However, more acid results in more dissolution of magnesium which is then lost with the filtrate.

It was therefore surprising that the amount of MgO could be greatly increased to achieve greater surface area and opacity improvement while simultaneously having a lower water-soluble pH when alumina is used as the base to maintain pH in the third layer step (depositing MgO).

Figure 3:
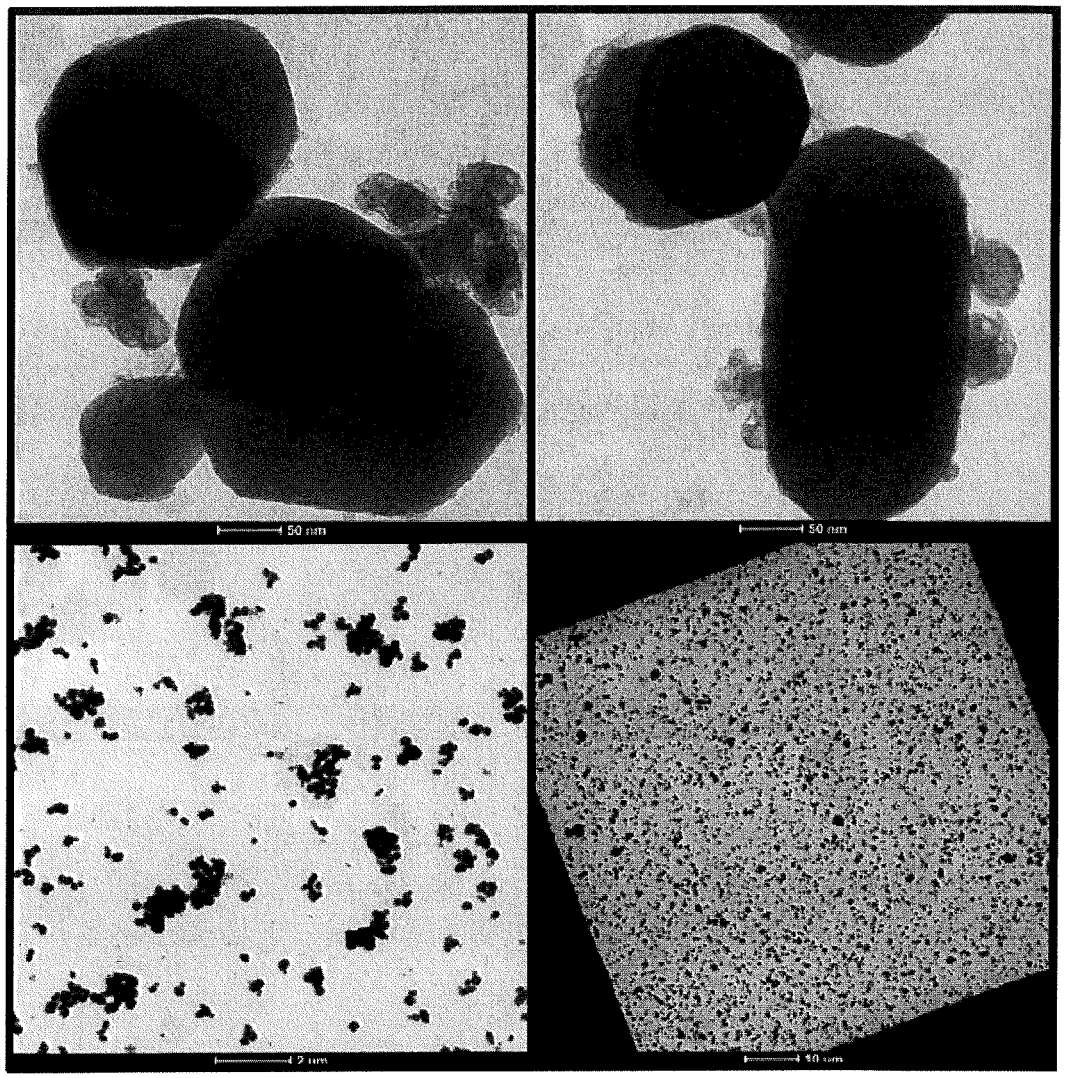
FIG. 3 is a TEM image of the product of Comparative Example 2 made in accordance with U.S. Pat. No. 5,665,466 and also the dispersion pattern on paper.
Figure 4:
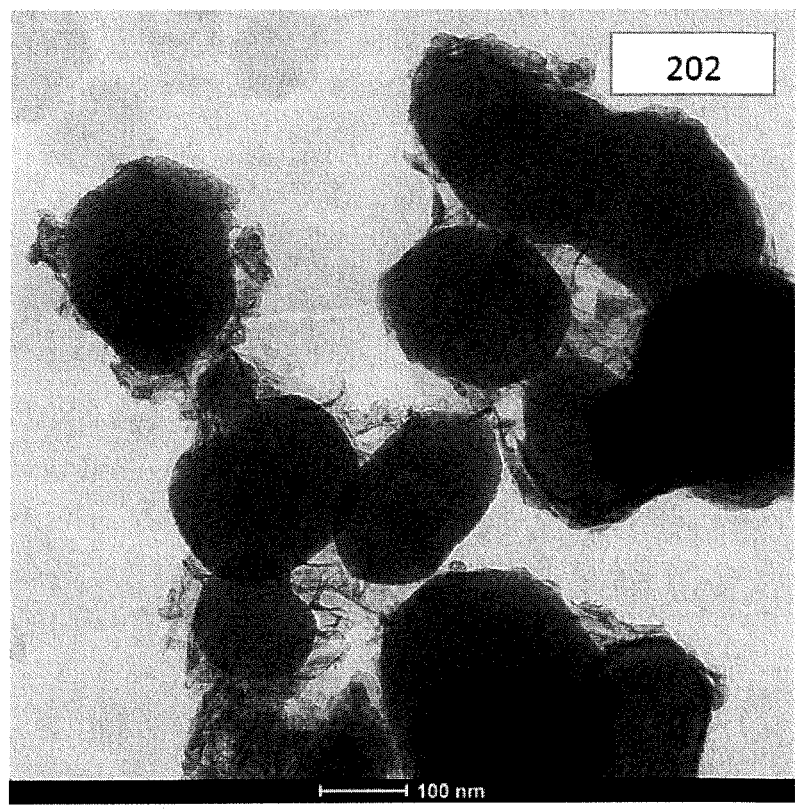
FIG. 4 is a TEM image of the product made in Example 1 of this application according with an embodiment of the invention.

The net result of this difference in application can be seen by comparing the TEM images of FIGS. 2 and 3 vs. FIG. 4.

The "meshy" area around the surface of the pigment in the top half of the TEM images in FIG. 4 contributes to the enhanced surface area as compared to the surfaces seen in the top half of the TEM images in FIGS. 2 and 3 which were prepared with a single-step alumina surface treatment.

The enhanced surface area was particularly surprising when looking at the surface areas of comparable state of the art commercially-available laminate-grade pigments—see Table 2 below:

TABLE 2

| Sample | BET Surface Area (m²/g) |
| --- | --- |
| Kronos ® 2800 | 9.6 |
| Tronox ® 8120 | 9.8 |
| Chemours ® R-796+ | 7.4 |
| Lomon ® LR-952 | 7.3 |
| Sachtleben ® R610L | 8.1 |
| Benchmark (RCL-722) | 9.7 |
| Example 1 | 24.0 |

An unexpected improvement in dispersion efficiency means that despite using less titanium dioxide than the comparative example and Benchmark, Example 1 was still able to show better opacity efficiency relative to the comparative examples and the Benchmark.

Effect on the Amount of MgO/Alumina in the Third Layer Step on $TiO_2$ Pigment Characteristics Table 3 below is a compilation of the characteristics of the titanium dioxide pigments produced in the above examples. Comparative Example 5 is also a high MgO content pigment which differs from Example 1 by the means of preparing the third layer (depositing MgO), but Example 1 shows comparable opacity improvement even with the lower surface area.

TABLE 1

| Example | % $AlPO_4$ | % added $Al_2O_3$ | % MgO | % $TiO_2$* | BET Surface Area m²/g | % Opacity Improvement vs. Benchmark | Water soluble pH |
| --- | --- | --- | --- | --- | --- | --- | --- |
| Benchmark | 3.80 | 3.01 | 0.00 | 89.2 | 9.7 | 0 | 7.1 |
| Comp. 1 | 3.47 | 3.80 | 0.06 | 88.4 | 9.5 | 0.4 | 8.5 |
| Comp. 2 | 3.40 | 3.71 | 0.19 | 88.2 | 11.4 | 1.4 | 8.9 |
| Comp. 3 | 3.66 | 3.40 | 0.90 | 83.5 | 14.7 | 1.2 | 8.2 |
| Example 1 | 2.29 | 5.26 | 1.79 | 82.6 | 24.0 | 10.2 | 7.7 |
| Comp. 4 | 3.66 | 3.40 | 2.10 | 83.5 | 21.1 | 5.1 | 8.1 |

*Variations in the amounts between the comparative examples and those reported in U.S. Pat. No. 5,665,466 are due to hydration on the surface of the treated titanium dioxide particles, hydration associated with the surface treatment and purity of the raw titanium dioxide pigments. For better comparison here, these factors have been accounted for in the same way between the examples and comparative examples.

TABLE 3

| Example | % AlPO$_4$ | % added Al$_2$O$_3$ | % MgO | % TiO$_2$ | BET Surface Area m$^2$/g | % Opacity Improvement vs. Benchmark | Water soluble pH |
|---|---|---|---|---|---|---|---|
| Comp. 5 | 2.24 | 5.18 | 1.64 | 84.1 | 29.8 | 11.0 | 8.1 |
| Example 1 | 2.29 | 5.26 | 1.79 | 82.6 | 24.0 | 10.2 | 7.7 |

Surprisingly, it is possible to achieve greater opacity, while maintaining the desired pigment properties for paper manufacturing, despite using less TiO$_2$ and using greater amounts of magnesium oxide in the surface treatment process. While not wishing to be bound by theory, it is believed that the properties were achieved because the specific process steps described for making the pigments of the invention resulted in forming at least some higher surface area boehmite instead of amorphous alumina and that the titanium dioxide particles of the invention are able to achieve better distribution efficiency than the comparative examples.

While particular embodiments of the invention have been illustrated and described, it will be obvious to those skilled in the art that various changes and modifications may be made without departing from the scope of the invention as defined in the appended claims.

While apparatuses and methods are described in terms of "comprising," "containing," or "including" various components or steps, the apparatuses and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Additionally, where the term "about" is used in relation to a range, it generally means plus or minus half the last significant figure of the range value, unless context indicates another definition of "about" applies.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A process for the surface treatment of titanium dioxide pigments, comprising the steps in the following order:
    (a) forming an aqueous suspension of titanium dioxide pigments;
    (b) precipitating a layer of alumina phosphate on the surface of the pigments;
    (c) precipitating a layer of alumina over the layer of alumina phosphate comprising the steps in the following order:
        (i) adding a first alumina source to the aqueous suspension;
        (ii) adding a second alumina source to the aqueous suspension, wherein the second alumina source is different from the first alumina source; and
        (iii) adding a third alumina source to the aqueous suspension;
        wherein steps (b), (c)(i), (c)(ii), and (c)(iii) are each followed by a maturation time;
    (d) precipitating a layer of magnesium oxide over the layer of alumina, wherein the precipitating of the layer of magnesium oxide comprises adding a magnesium source to the aqueous suspension after step (c) and adding a basic alumina source to the suspension during the addition of magnesium; and
    (e) recovering the titanium dioxide pigments from the suspension.

2. The process of claim 1, wherein in step (d) the basic alumina source is added so that the suspension does not become more acidic during the addition of the magnesium source than the suspension was at the end of step (c).

3. The process of claim 2, wherein the pH of the suspension is kept at or below 8.5 during step (d).

4. The process of claim 3, wherein step (d) is followed by a maturation time.

5. The process of claim 4, wherein the maturation time is from 1 minute to 30 minutes.

6. The process of claim 2, wherein the first alumina source, the second alumina source, the third alumina source, and the basic alumina source are each selected from the alumina-source group consisting of aluminum sulfate (Al$_2$(SO$_4$)$_3$), sodium aluminate (Na AlO$_2$), aluminum chloride (AlCl$_3$) and combinations thereof.

7. The process of claim 6, wherein the second alumina source does not include a member of the alumina-source group that is included in the first alumina source, and wherein the third alumina source includes at least one member of the alumina-source group that is included in the first alumina source or the second alumina source.

* * * * *